United States Patent
Ehrhardt et al.

(10) Patent No.: US 8,402,388 B2
(45) Date of Patent: Mar. 19, 2013

(54) SETTING UP A COMMUNICATION PROCEDURE BETWEEN INSTANCES AND A PROTOCOL TESTER USING THE METHOD

(75) Inventors: Joerg Ehrhardt, Berlin (DE); Jens Kittan, Schwante (DE); Wolfgang Borgert, Berlin (DE)

(73) Assignee: Tektronix, Inc., Beaverton, OR (US)

( * ) Notice: Subject to any disclaimer, the term of this patent is extended or adjusted under 35 U.S.C. 154(b) by 1736 days.

(21) Appl. No.: 09/776,040

(22) Filed: Feb. 1, 2001

(65) Prior Publication Data

US 2001/0015732 A1   Aug. 23, 2001

(30) Foreign Application Priority Data

Feb. 23, 2000   (EP) ..................................... 00103798

(51) Int. Cl.
*G06F 3/048*   (2006.01)
(52) U.S. Cl. ........ 715/798; 715/700; 714/712; 714/738; 714/43
(58) Field of Classification Search .................. 715/700, 715/734–36, 736–740, 798; 709/220–230; 345/700, 734–736, 711
See application file for complete search history.

(56) References Cited

U.S. PATENT DOCUMENTS

| | | | | | |
|---|---|---|---|---|---|
| 5,027,343 | A | * | 6/1991 | Chan et al. | 370/250 |
| 5,579,476 | A | * | 11/1996 | Cheng et al. | 714/32 |
| 5,715,432 | A | | 2/1998 | Xu et al. | |
| 5,732,213 | A | * | 3/1998 | Gessel et al. | 709/224 |
| 5,774,695 | A | * | 6/1998 | Autrey et al. | 703/26 |
| 6,115,393 | A | * | 9/2000 | Engel et al. | 370/469 |
| 6,405,195 | B1 | * | 6/2002 | Ahlberg | 707/4 |
| 6,411,806 | B1 | * | 6/2002 | Garner et al. | 455/428 |
| 6,560,723 | B1 | * | 5/2003 | Matsui | 714/39 |
| 6,697,604 | B1 | * | 2/2004 | Rimpela et al. | 455/67.14 |

FOREIGN PATENT DOCUMENTS

| | | | | |
|---|---|---|---|---|
| KR | 2001011475 | A | * | 2/2001 |
| WO | 9857268 | | | 12/1998 |

OTHER PUBLICATIONS

Spirent TestCenter spirent application Layer Protocol Test solution; Spirent Communication, Inc.; 2010; 4 pages.*
Paul G.j Engelen; Testing Protocols embedded in Layered Structures; Aug. 1993; 64 pages.*
Wayne High; A formal Protocol Test Procedure for the Survivable Adaptable fiber Optic Embedded Network; Noval Postgraduate School; Mar. 1993; 120 pages.*
Yang et al.; A New Evaluation Model for Security Protocols; Journal of Communications, vol. 6, No. 6, Sep. 2011; 10 pages.*
Muller, Nathan J., "Design and Conquer," Byte, State of the Art, XP 000683573, Oct. 1996, pp. 93, 94, 96, and 98.

(Continued)

*Primary Examiner* — William Bashore
*Assistant Examiner* — Linh K Pham
(74) *Attorney, Agent, or Firm* — Fogarty, L.L.C.

(57) ABSTRACT

A method of setting up a communication procedure between instances, one of which is a protocol tester that uses the method, includes the steps of selecting the instances, selecting a protocol layer for the communication procedure, selecting abstract communication interfaces for the protocol layer; selecting communication data and automatically setting up the communication procedure on the basis of the results of the selecting steps. Any of the selecting steps may be performed graphically, and parameters selected are assigned description files that are used in the setting up step.

20 Claims, 7 Drawing Sheets

OTHER PUBLICATIONS

Neuendorff, H., "Übertragungsqualität im modernen Kommunikationsnetz standardissiert prüfen und sichern TTCN-Compiler erzeugt auf Protokolltester K1197 genormte Konformitätstresis nach ISO 9646-3 fur ISDN und CCS7," Telecom Report, Mar./Apr. 1994, pp. 76-77, No. 2, Siemens AG, Munchen, DE.

* cited by examiner

SETTING UP A COMMUNICATION PROCEDURE BETWEEN INSTANCES AND A PROTOCOL TESTER USING THE METHOD

BACKGROUND OF THE INVENTION

The present invention relates to protocol testing, and more particularly to a method of setting up a communication procedure between instances, with one of the instances being a protocol tester, and to a protocol tester using the method.

In the field of protocol testing it is necessary to clearly specify a communication procedure by which a test is described so that the procedure may be executed automatically by a protocol tester. Languages such as TTCN (Tree and Tabular Combined Notation) make this possible, but they are complex and difficult to understand for an untrained reader. TTCN has prevailed in the field of Conformance Testing because these tests are very comprehensive, and TTCN supports such comprehensive tests very well. Apart from that, there are various proprietary test description languages. To facilitate understanding a standardized language, MSC (Message Sequence Charts), is used for the purpose of documenting and describing simple procedures. Further details on MSC may be taken from ITU-T Z.120, the contents of which are incorporated herein by reference. MSC consists of standardized process flow diagrams, also referred to as arrow diagrams or X diagrams. These diagrams may be understood independent of programming language. However, automatic execution of communications described by MSC is not possible on protocol testers. To obtain tests that are executable it is, therefore, necessary to write so-called "scripts", which requires that the user becomes thoroughly acquainted with the relevant programming language. In addition it is necessary to prepare documentation that is generally understood. For a test it is, therefore, necessary on the one hand to prepare graphical and textual documentation and on the other hand a source code or binary code that may be executed.

This state of the art results in a number of disadvantages. It is frequently necessary to convert existing tests, so there is a risk of inconsistencies. The test communication specifications often do not contain information on the configuration, or at least not in a format that may be read by a machine or by man. The different languages often represent proprietary approaches, which differ from equipment to equipment and have to be learned anew. The user is not supported or only receives rudimentary support with protocol knowledge when creating the messages and events.

What is desired is a method, and protocol tester using the method, that overcomes the above-noted disadvantages.

BRIEF SUMMARY OF THE INVENTION

Accordingly the present invention provides a method of setting up a communication procedure between instances, one of which is a protocol tester, by executing the following steps on the protocol tester: selecting instances that are to take part in the communication procedure; selecting a protocol layer on the basis of the communication procedure; selecting abstract communication interfaces of the protocol layer for the communication procedure; selecting communication data; and automatically setting up through the protocol tester on the basis of the above selections the communication procedure. Communication data are containe in description files. The description of the communication procedure is made graphically.

The objects, advantages and other novel features of the present invention are apparent from the following detailed description when read in conjunction with the appended claims and attached drawing.

DETAILED DESCRIPTION OF THE INVENTION

Figure 1:
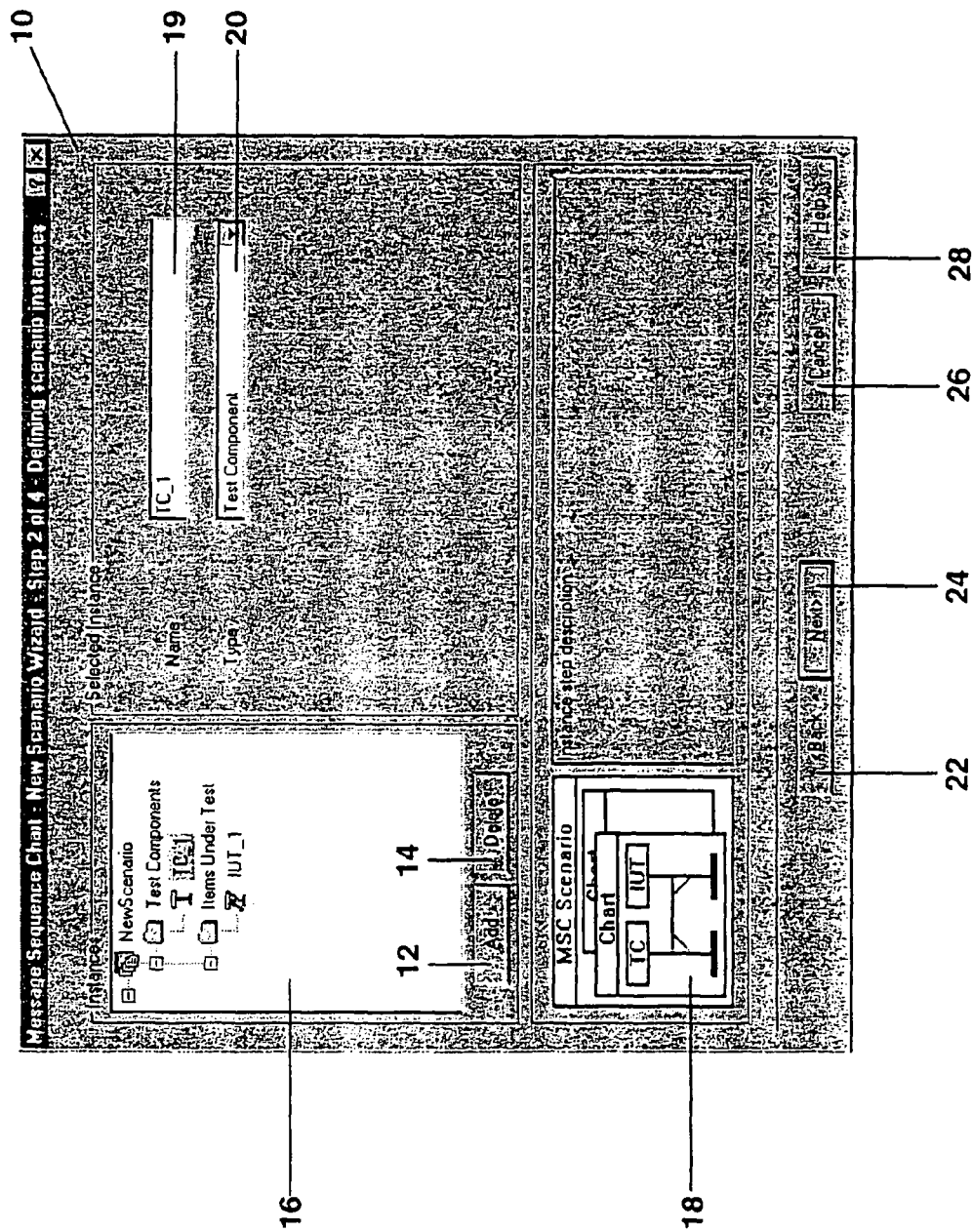
FIG. 1 is a plan view of a first graphical user interface (GUI) for a method according to the present invention.

FIG. 1 shows a graphical user interface (GUI) 10 that allows in a first step graphically selecting instances taking part in a communication procedure. Graphical selection in connection means that a symbol or a text proposal is shown graphically on the GUI, such as on a personal computer (PC) screen, and may be selected by simple activation, i.e., by clicking on it with a "mouse." One of the instances is a protocol tester on which the method as described herein is made available, with the protocol tester in the present case emulating a component, TC_1. Using two buttons, "Add" 12 and "Delete" 14, a user may add further instances or delete instances listed. In a field 16 the compilation of instances is listed, while in another field 18 the compilation is shown as a diagram. In another field 19 the name of the instance may be selected, and in a further field 20 the instance type is shown. Two buttons, "Back" 22 and "Next" 24, allow the user to move from one level of the definition of the communication procedure to the next, both in the direction of more detailed specifications and in the direction of higher-level presentations. A "Cancel" button 26 allows leaving a level, meaning that the changes made are reset. A "Help" button 28 offers the user further support.

Figure 2:
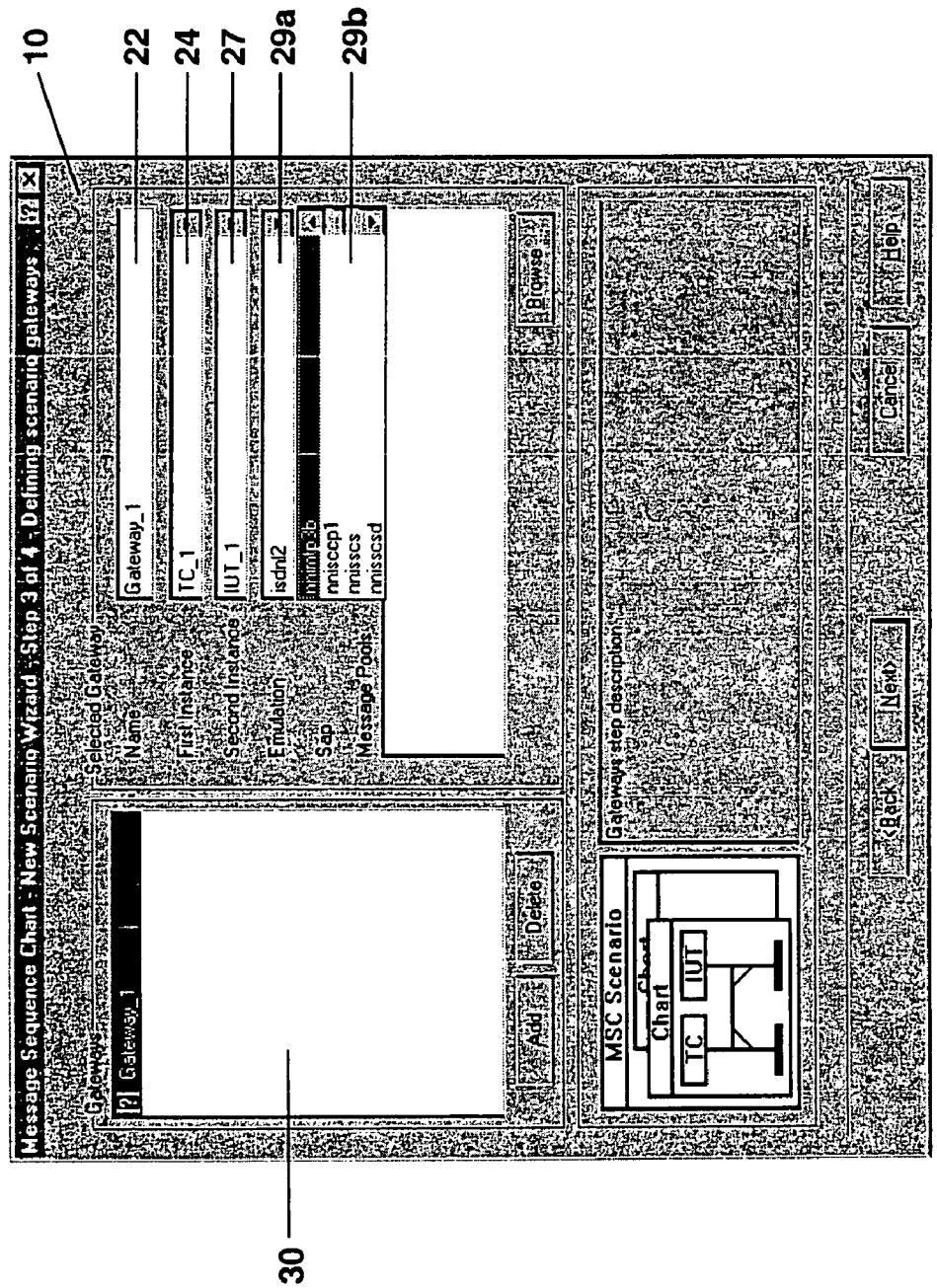
FIG. 2 is a plan view of a second GUI for a method according to the present invention.

According to FIG. 2, which shows another representation of the GUI 10, the present communication procedure has the name Gateway_1, as shown in field 23. Taking part in the procedure is a first instance TC_1, according to field 25, and a second instance IUT_1, according to field 27. According to field 29a the emulated protocol is of the type "isdn12" with field 29b offering further protocols from which to choose. In field 30 various communication procedures that may be chosen for further processing may be offered. Buttons 12, 14, 22, 24, 26, 28 described with reference to FIG. 1 appear again in similar form and with similar functions.

Figure 3:
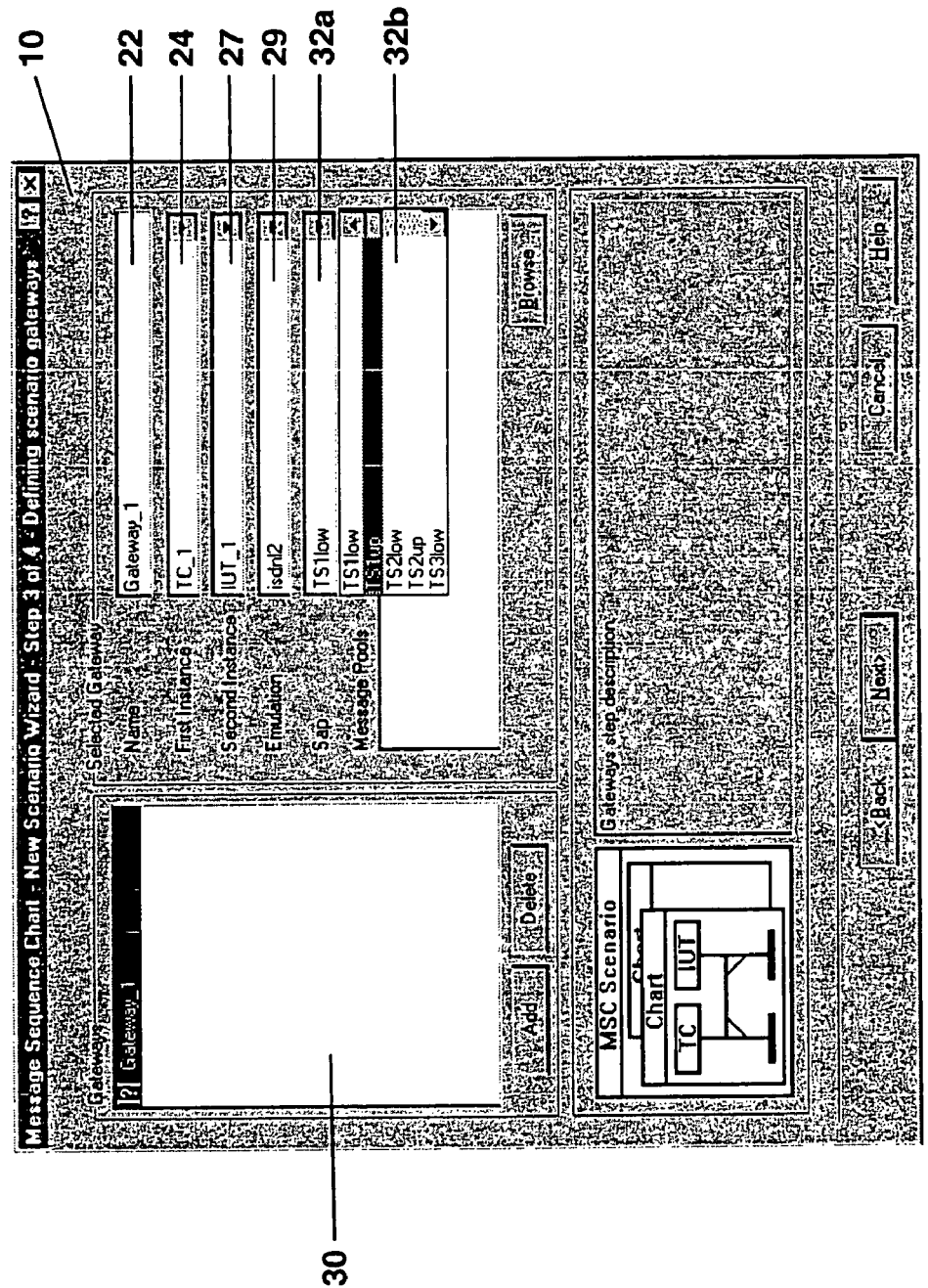
FIG. 3 is a plan view of the second GUI of FIG. 2 in another presentation mode.

FIG. 3 shows the GUI of FIG. 2 in a different presentation mode, in this case for selecting a Service Access Point (SAP), as shown in field 32a. In field 32b there are further SAPs from which to choose. All SAPs shown in field 32b are offered for the selected emulation "isdn12."

Figure 4:
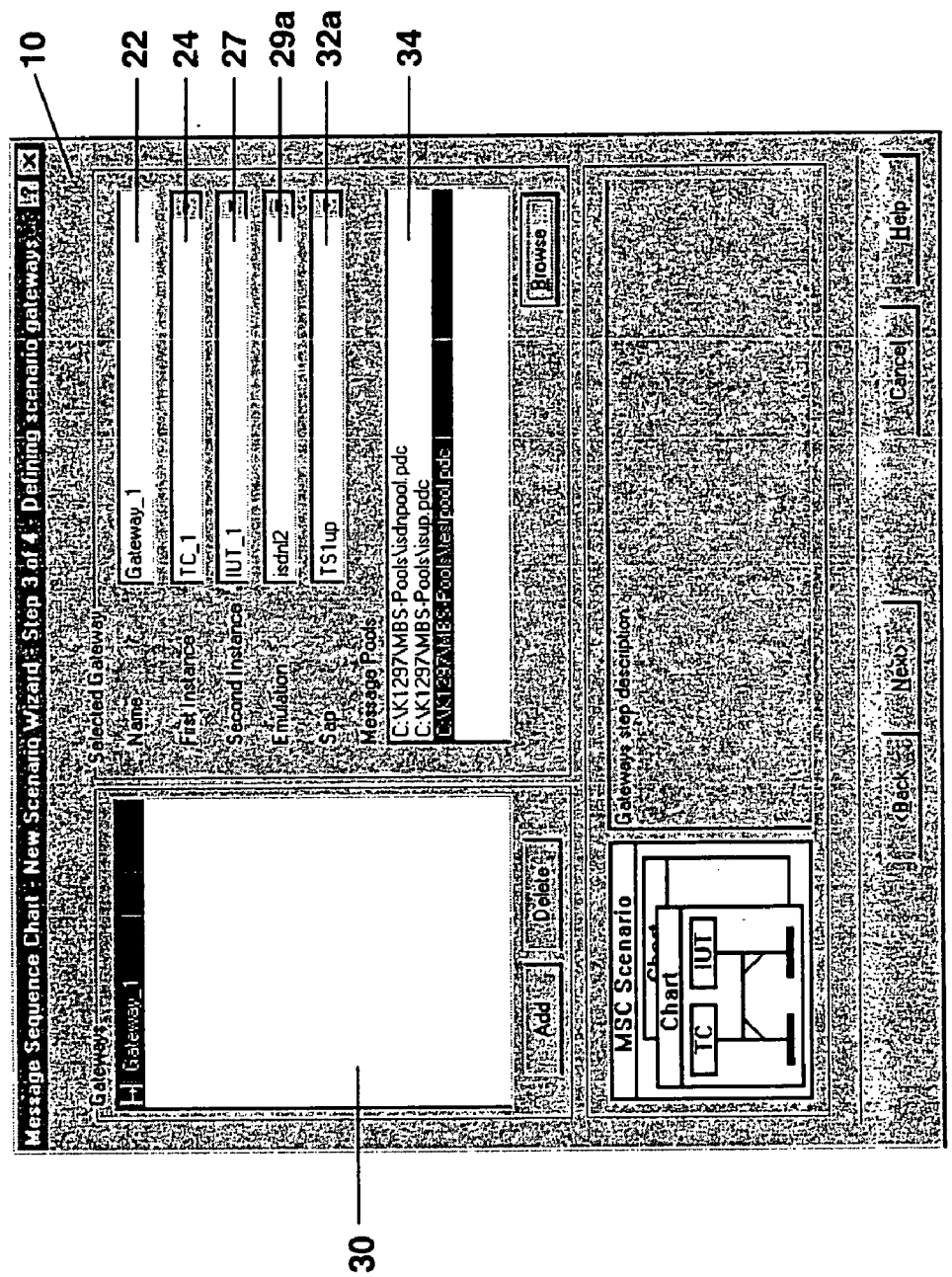
FIG. 4 is a plan view of the second GUI of FIG. 2 in a further presentation mode.

FIG. 4 shows another presentation form of the GUI 10 of FIG. 2, with a format for the communication data (Abstract Service Primitives—ASPs, Protocol Data Units—PDUs) now being used in a field 34 having so-called Message Pools.

Figure 5:
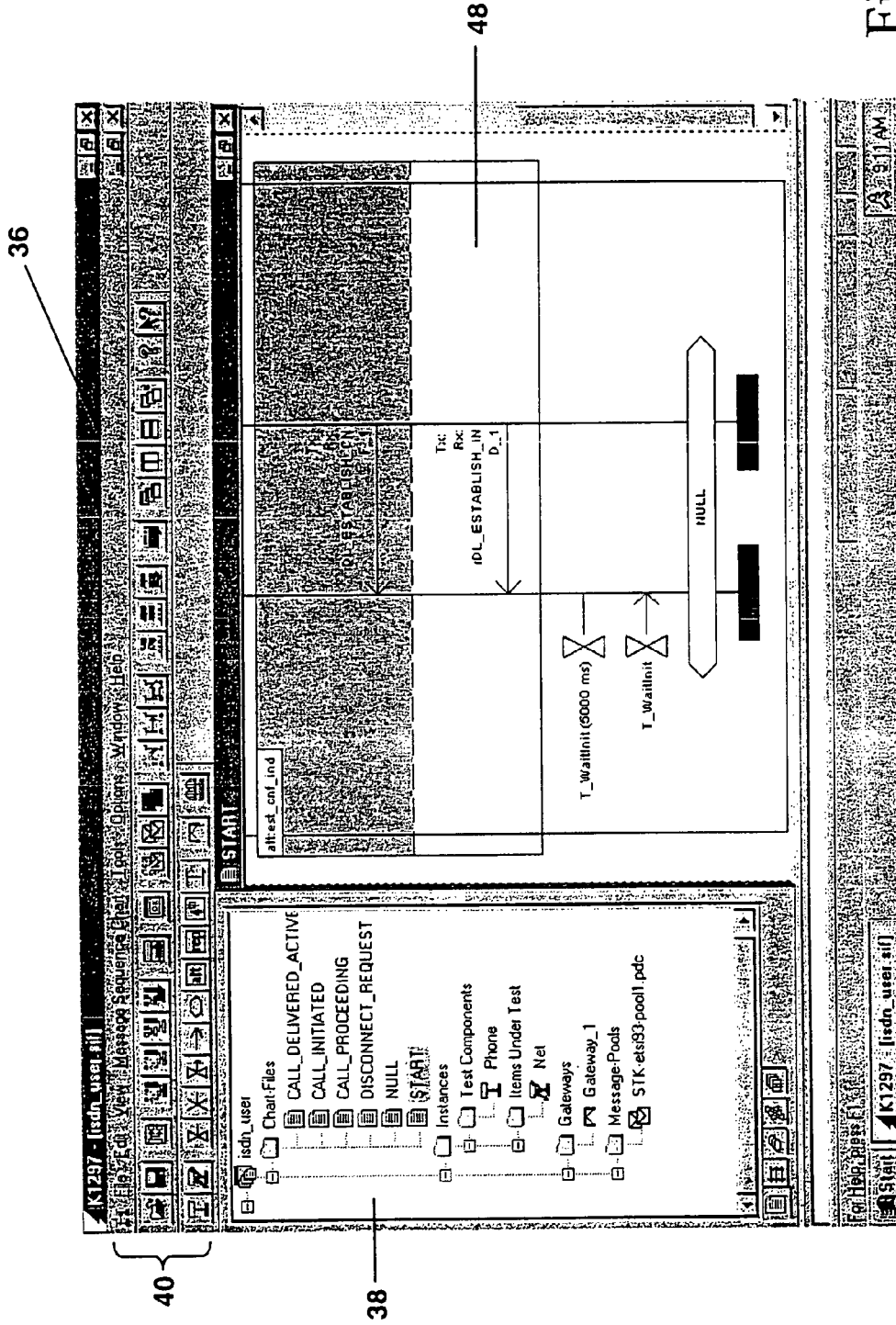
FIG. 5 is a plan view of a third GUI for a method according to the present invention.

FIG. 5 shows another GUI 36 that provides the user with various types of information in a field 38. First the instances selected by the user, then the test scenario (Gateway_1) agreed in accordance with FIGS. 1-4, and finally the data format (Message Pools).

Figure 6:
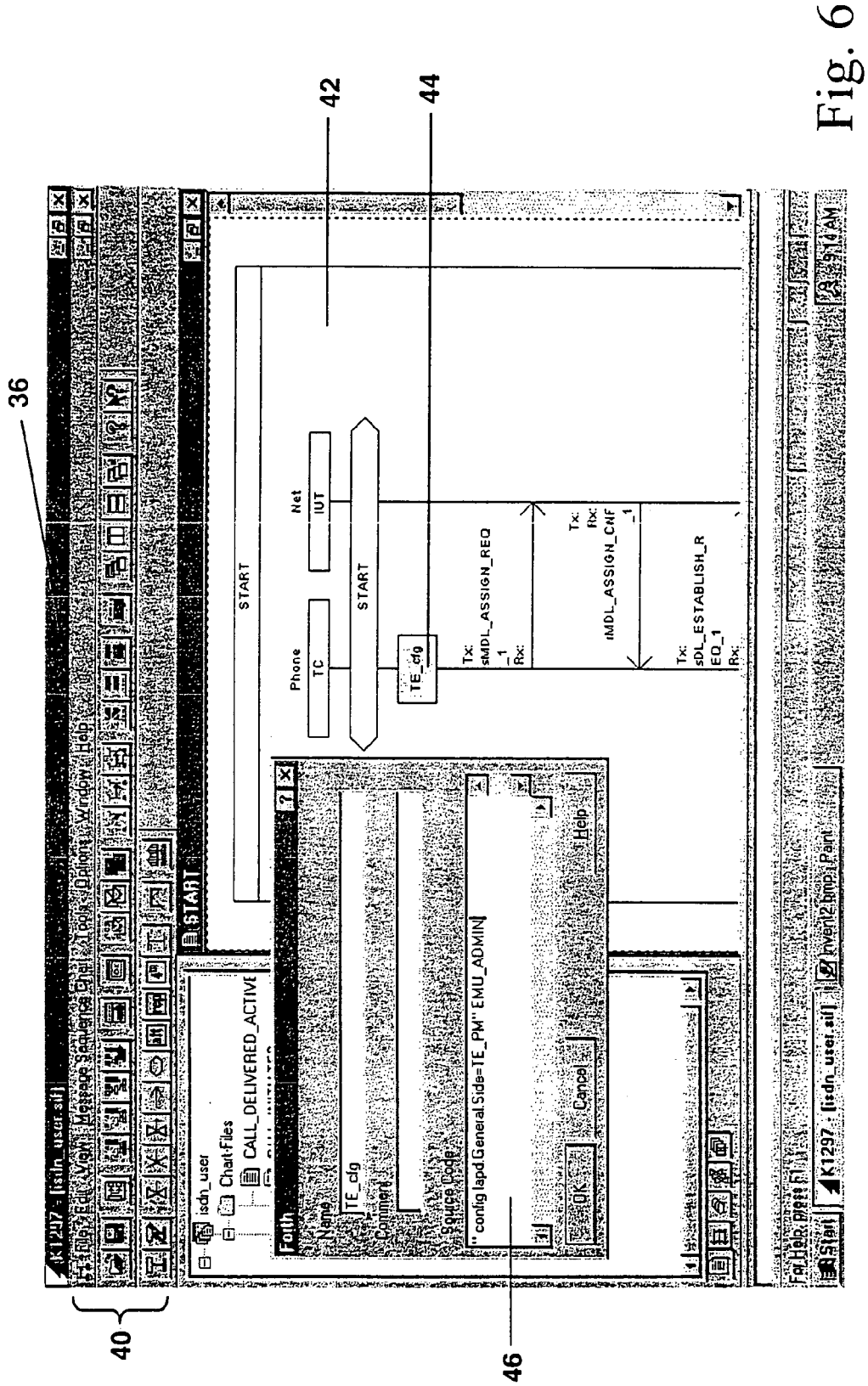
FIG. 6 is a plan view of the third GUI of FIG. 5 in another presentation mode.

The following initially only refers to FIG. 6. The GUI 36 shows a large number of buttons 40 that, as is known from word processing or graphics programs, may be clicked by using a mouse. Using these buttons 40 the user may graphically set up the communication procedure in field 42. FIG. 6 shows the possibility of incorporating codes in the programming language Forth (Draft Proposal ANSI Standard 1994) into a block TE_cfg 44 by using an entry mask 46. To enter codes in another programming language other entry masks may be used.

Returning to FIG. 5 as an example of a part of the communication procedure shown in field 48, an instance is awaiting, initially alternatively, the ASPs DL_ESTABLISH_CNF_1 or DL_ESTABLISH_IND_1. Next a timer T_Waitinit with a five (5) second duration is started and the elapsing of the time is awaited.

Figure 7:
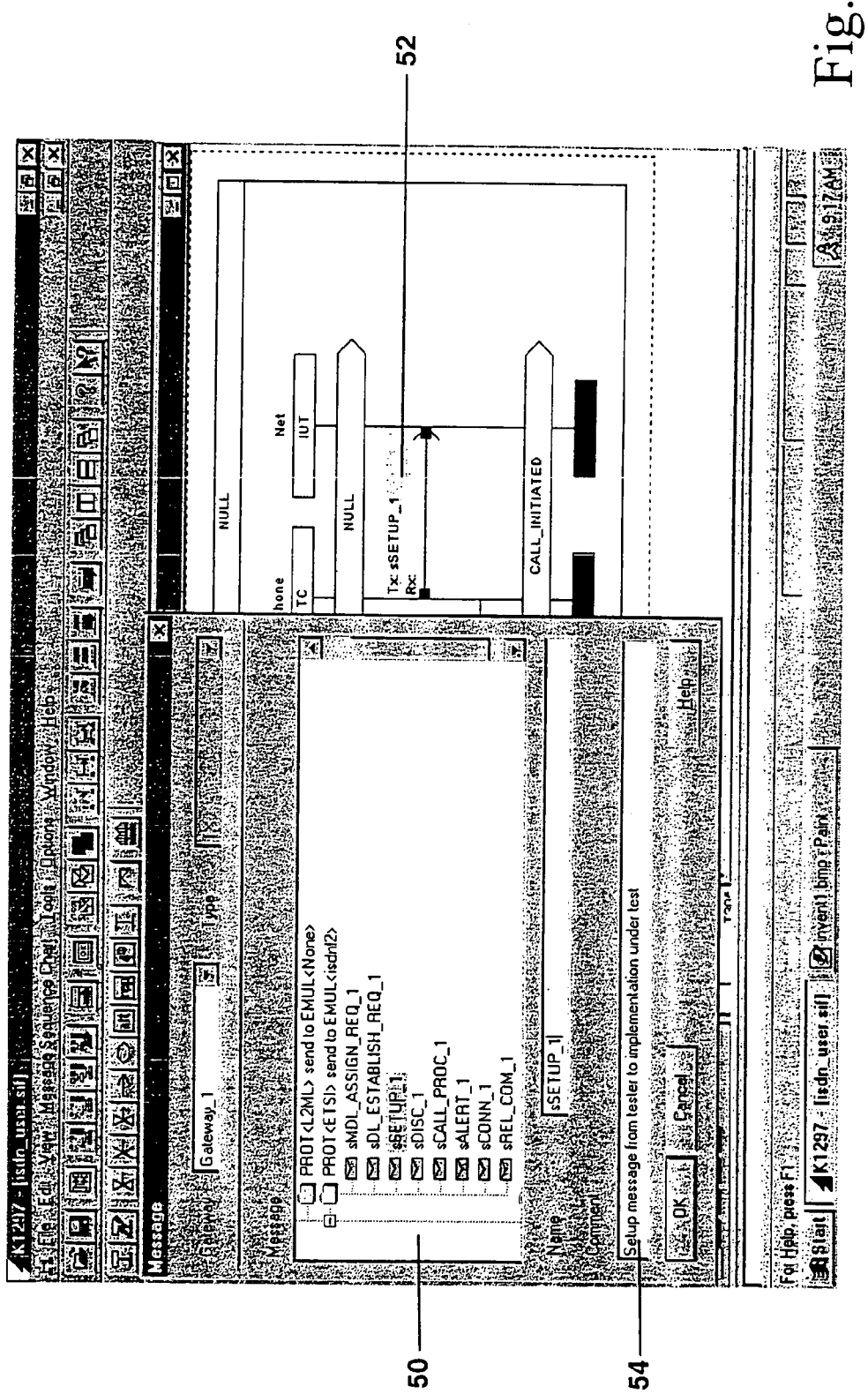
FIG. 7 is a plan view of the third GUI of FIG. 5 in a further presentation mode.

FIG. 7 shows an isdn-PDU "SETUP_1" being incorporated into a flow diagram prepared graphically as a send message. ASPs with PDUs from the Message Pool selected earlier are offered in an entry mask 50. The PDU selected may be entered into a visually highlighted field 52. In a field 54 the user is offered further information on the ASP or PDU selected.

In this way it is possible to set up the communication procedure, with preferably all selectable parameters being assigned description files that may be used with each other to automatically set up through the protocol tester the communication procedure to be executed between the instances.

When a code that may be executed is created, there are three interacting components. First the GUI stores the selected parameters, in particular the communication sequence, in an internal structure. Then a compiler translates the selected parameters into temporary files. Finally a linker reads the temporary files and converts them into the selected interpreter script language, such as ANS Forth. During this process the communication procedure as defined by the user is written into a script file.

Annex A1 shows the code automatically generated by the protocol tester for the figures described.

What is claimed is:

1. A method of setting up a communication procedure between instances, comprising the steps of:
    selecting the instances that take part in the communication procedure, one instance being a protocol tester and another instance being an item under test;
    selecting a protocol layer to be emulated by the protocol tester for testing a specified protocol layer of the item under test on the basis of the communication procedure, the protocol layer selected from a displayed list of protocol layers that are capable of being emulated by the protocol tester, the list of protocol layers including at least one layer 2 protocol from an OSI (Open Systems Interconnection) reference model;
    selecting abstract communication interfaces of the emulated protocol layer for the communication procedure, the abstract communication interfaces selected from a displayed list of abstract communication interfaces associated with the selected protocol layer;
    selecting communication data contained in description files to be exchanged at the abstract communication interfaces; and
    automatically setting up through the protocol tester the communication procedure on the basis of the selections made in the above selecting steps, with parameters for the abstract communications interfaces and the communication data selecting steps being made graphically.

2. The method as recited in claim 1 wherein the instances selecting step comprises the step of selecting the instances graphically, and/or the emulated protocol layer selecting step comprises the step of selecting the emulated protocol layer graphically, and the parameters selectable in these steps being assigned description files that are used in the setting up step.

3. The method as recited in claim 2 wherein the abstract communication interfaces comprise Service Access Points (SAPs).

4. The method as recited in claim 3 wherein the communication data comprise at least one type selected from the group consisting of Protocol Data Units (PDUs) and Abstract Service Primitives (ASPs).

5. The method as recited in claim 2 wherein the communication data comprise at least one type selected from the group consisting of Protocol Data Units (PDUS) and Abstract Service Primitives (ASPs).

6. The method as recited in claim 1 wherein the abstract communication interfaces comprise Service Access Points (SAPs).

7. The method as recited in claim 6 wherein the communication data comprise at least one type selected from the group consisting of Protocol Data Units (PDUs) and Abstract Service Primitives (ASPs).

8. The method as recited in claim 1 wherein the communication data comprise at least one type selected from the group consisting of Protocol Data Units (PDUS) and Abstract Service Primitives (ASPs).

9. The method as recited in claim 1 wherein the communication data selecting step comprises the steps of:
    graphically selecting a data format; and
    graphically setting up a communication sequence between the selected instances.

10. The method as recited in claim 9 wherein the graphically setting up step comprises the step of entering source code.

11. A protocol tester comprising:
    means for selecting instances taking part in a communication procedure, one of the instances being the protocol tester and another instance being an item under test;
    means for displaying a list of protocol layers capable of being emulated by the protocol tester, the list of protocol layers including at least one layer 2 protocol from an OSI (Open Systems Interconnection) reference model;
    means for selecting a protocol layer to be emulated by the protocol tester for testing a specified protocol layer of the item under test on the basis of the communication procedure;
    means for displaying a list of abstract communication interfaces for the communication procedure, the list of abstract communication interfaces associated with the selected protocol layer to be emulated;
    means for selecting abstract communication interfaces of the emulated protocol layer for the communication procedure;
    means for selecting communication data contained in description files to be exchanged at the abstract communication interfaces; and
    means for automatically setting up the communication procedure through the protocol tester on the basis of the selections of the various selecting means, with parameters for the abstract communication interfaces and the communication data selecting means being made graphically.

12. The protocol tester as recited in claim 11 wherein the instances selecting means and/or the emulated protocol layer selecting means comprise graphical selecting means and the parameters selected by these selecting means are assigned description files that are used in the automatically setting up means.

13. The protocol tester as recited in claim 12 wherein the abstract communication interfaces comprise Service Access Points (SAPs).

14. The protocol tester as recited in claim 13 wherein the communication data comprises one type selected from the group consisting of Protocol Data Units (PDUs) and Abstract Service Primitives (ASPs).

15. The protocol tester as recited in claim 14 further comprising means for entering source codes.

16. The protocol tester as recited in claim 11 wherein the abstract communication interfaces comprise Service Access Points (SAPs).

17. The protocol tester as recited in claim 16 wherein the communication data comprises one type selected from the group consisting of Protocol Data Units (PDUs) and Abstract Service Primitives (ASPs).

18. The protocol tester as recited in claim 17 further comprising means for entering source codes.

19. The protocol tester as recited in claim 11 wherein all parameters selected by all the selecting means are assigned description files that are used by the setting up means.

20. A graphical user interface for a protocol tester comprising:
- means for graphically selecting devices to be used in a communication procedure, a first being the protocol tester and a second device being an item under test;
- means for displaying a list of protocol layers capable of being emulated by the protocol tester, the list of protocol layers including at least one layer 2 protocol from an OSI (Open Systems Interconnection) reference model;
- means for graphically selecting a protocol layer to be emulated by the protocol tester for testing a specified protocol layer of the item under test;
- means for displaying a list of service access points for the communication procedure, the list of service access points interfaces associated with the selected protocol layer;
- means for graphically selecting service access points of the protocol layer to be emulated for the communication procedure;
- means for graphically selecting communication data to be exchanged at the service access points, the communication data contained in description files; and
- means for automatically setting up the communication procedure through the protocol tester on the basis of the selections of the various selecting means.

* * * * *